Oct. 11, 1932.  H. PARKER  1,881,913
METHOD OF LAYING MULTIPLE CONDUIT AND COUPLING FOR SAME
Original Filed March 9, 1928
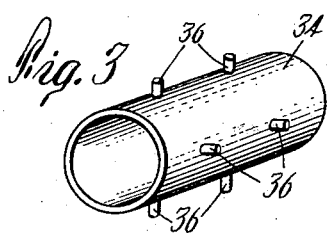
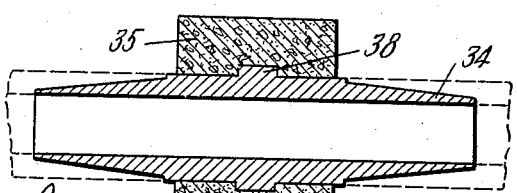
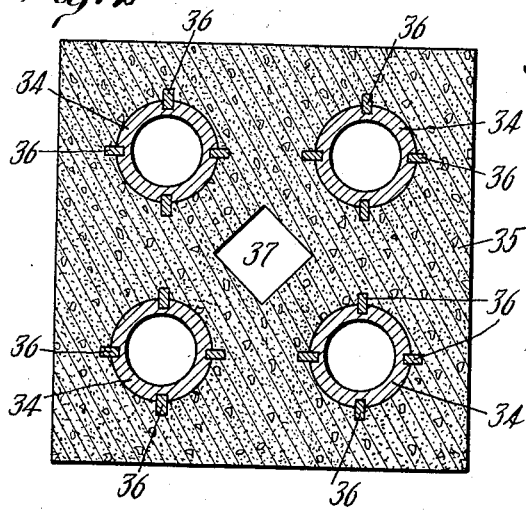
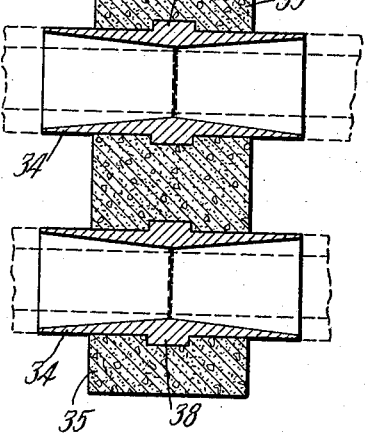
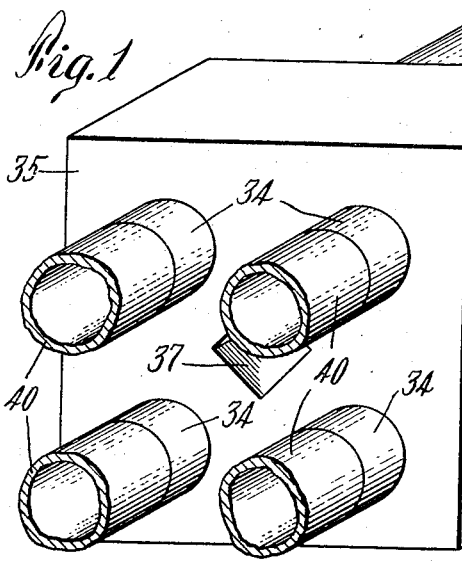
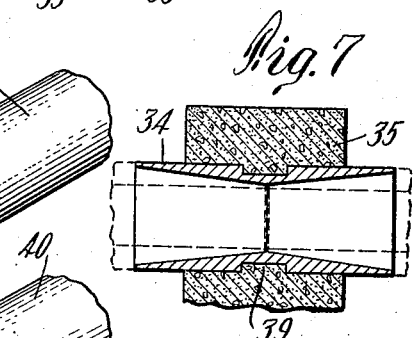
Inventor:
Howard Parker
by
Wright Brown Quinby May
Attys.

Patented Oct. 11, 1932

1,881,913

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

METHOD OF LAYING MULTIPLE CONDUIT AND COUPLING FOR SAME

Original application filed March 9, 1928, Serial No. 260,452, and in Canada March 4, 1929. Divided and this application filed June 19, 1930. Serial No. 462,389.

This application is a division of my copending application Serial No. 260,452 filed March 9, 1928, which has matured into Patent No. 1,804,478 of May 12, 1931. The invention relates to the laying of fiber conduit in multiple. For many purposes, a fabricated conduit of waterproofed fiber is found desirable by reason of its comparative toughness, strength, durability, lightness and low price. A particularly desirable kind of conduit of the waterproofed fiber type is made by winding a sheet of wet pulp upon itself under pressure in convolutions until the desired wall thickness is obtained, drying out the moisture, and saturating the dry tube with asphaltic or other waterproofing material. Sections of conduit may be laid end to end and united by suitable couplings to form continuous conduits of indeterminate length suitable for use as pipe-lines or for telephone or electric power cables or for any other uses to which conduits are put. In some cases it is preferred to use the conduits as cores about which concrete or other filling may be poured and set, the fiber conduits remaining in the structure to line the bores which they form in the filler.

As conduits of this kind are particularly adapted for use as containers of electric wires such as telephone wires and power cables, it is important that the multiple structure be capable of assembly with no metal fasteners penetrating the walls of the conduits. It is also desirable that the spacers which hold the conduits apart be constructed of durable material preferably adapted to bond with the concrete or other material which may be used in filling in the spaces between the individual conduits after the latter are laid in position.

According to the invention, multiple members comprising a plurality of coupling elements fixed in a spacing block of cement or the like, can conveniently be used with sections of individual conduit in the laying of a multiple conduit of indefinite length. To this end, the multiple coupling members are set up successively, individual conduit sections being assembled therewith progressively. The multiple coupling members thus act both as couplings and as spacers for the individual assembled conduits which may thereupon be encased in concrete. This invention is particularly advantageous from the point of view of economy in transportation from the mill to the job. Assembled sections of multiple conduit are comparatively bulky compared to the combined bulk of the individual conduits of which they are made. Hence a considerable economy of space may be effected by this form of the invention.

Other advantageous features of the invention will be apparent to one skilled in the art from the following description and from the drawing, of which,—

Figure 1 shows in perspective a spacer unit in the form of a multiple coupling block, portions of individual conduit sections being also shown to indicate the manner of use of the coupling block when laid.

Figure 2 is a transverse section of the multiple coupling block shown in Figure 1.

Figure 3 shows a coupling having anchoring pins projecting therefrom.

Figures 4-7 are sections illustrating couplings of various kinds which may be cast in a block.

Referring to the drawing in detail, 35 indicates a spacer block molded about a plurality of fixed collars which take the form of coupling elements 34 and are arranged in suitably spaced relation. The block is preferably of a suitable moldable material such for example as cement. In order to anchor the individual couplings 34 securely in place in the block 35, wooden pegs 36 or other anchoring members may be partly driven into the wall of each coupling 34. The desired number of couplings may then be held in a jig while the material for the block 35 is poured around them. If space permits, an opening or openings 37 may be left in the block to save weight and to afford more points of bonding for the concrete or other material subsequently poured around and between the conduits when installed on a job.

Instead of pegs 36 as anchoring means, I may provide other equivalent means such as a peripheral rib 38 or other projections on the outer surface of each coupling. Similarly, one or more depressions such as a groove 39 may be formed on the outer surface of the couplings to lock with the block 35, such a groove being indicated in Figure 7. Projections or depressions may be conveniently formed by making coupling with walls of extra thickness and cutting away portions of the wall to leave a projecting portion as shown in Figures 4 to 6 or cutting recesses or depressions such as the groove shown in Figure 7. Figures 4 to 6 illustrate different types of couplings which may be employed, Figure 4 showing two male ends, Figure 6 two female ends, and Figure 5 one end of each kind. It is obvious that grooves or depressions may be cut on any of these types of couplings instead of the rib shown.

In using the multiple coupling, successive multiple couplings are set up on the job alternately with individual conduits between them, the couplings serving to support the conduits in properly spaced relation as well as to provide joints for abutting ends of individual conduits. Figure 1 illustrates the manner of laying a multiple coupling block with individual conduit sections, fragments of which are indicated at 40.

Certain embodiments of this invention having thus been described, it should be evident to those skilled in the art that various changes and modifications might be made therein without departing from its spirit or scope as defined by the appended claims.

I claim:

1. As a separate article of manufacture, a multiple coupling for fiber conduit, comprising a plurality of individual coupling members in predetermined spaced relation, and a block of plastic material cast around the central portion of each coupling.

2. As a separate article of manufacture, a multiple coupling for fiber conduit, comprising a plurality of individual fiber couplings having projections on the outer surface thereof, and a cement block cast about a longitudinal section of each coupling, said block interlocking with said projections and holding said couplings in predetermined relative position.

3. As a separate article of manufacture, a multiple coupling for fiber conduit, comprising a plurality of individual fiber couplings, each coupling having a portion of its exterior surface projecting further from its axis than other portions of the surface, a cement block engaging all said couplings and interlocking with said projecting portions whereby the individual couplings are securely anchored in predetermined relative positions.

4. As a separate article of manufacture, a multiple coupling for fiber conduit, comprising a plurality of individual fiber couplings, each having a peripheral ridge, and a cement block cast about said couplings and interlocking with said ridges.

In testimony whereof I have affixed my signature.

HOWARD PARKER.